United States Patent [19]

Finkle et al.

[11] Patent Number: 4,601,689

[45] Date of Patent: Jul. 22, 1986

[54] METHOD AND APPARATUS FOR FOLDING POLYMERIC SHEET MATERIAL AND FLEXIBLE DISK JACKETS MADE THEREBY

[75] Inventors: Mark A. Finkle, Fremont; James D. Fishman, Pleasanton, both of Calif.

[73] Assignee: Unmanned Solutions, Inc., Fremont, Calif.

[21] Appl. No.: 588,059

[22] Filed: Mar. 12, 1984

[51] Int. Cl.$^4$ .............................................. B31B 1/36
[52] U.S. Cl. .................................. 493/251; 493/261; 493/397; 156/227; 156/216; 264/339
[58] Field of Search ............... 493/251, 243, 209, 252, 493/250, 260, 264, 397, 399, 162; 156/227, 216, 217, 443, 492; 264/339; 425/383

[56] References Cited

U.S. PATENT DOCUMENTS

| | | | |
|---|---|---|---|
| 1,872,482 | 8/1932 | Messing | 264/339 |
| 3,580,770 | 5/1971 | Dyal | 156/216 |
| 4,239,572 | 12/1980 | Tomita | 493/162 |
| 4,310,371 | 1/1982 | Appoldt | 493/231 |
| 4,347,091 | 8/1982 | Hauck et al. | 156/227 |
| 4,367,117 | 1/1983 | Seaborn | 156/227 |
| 4,415,325 | 11/1983 | Fuchs et al. | 264/339 |
| 4,478,664 | 10/1984 | Elias | 156/216 |
| 4,532,793 | 8/1985 | Bezold | 72/342 |

Primary Examiner—Francis S. Husar
Assistant Examiner—David B. Jones
Attorney, Agent, or Firm—Michael J. Hughes

[57] ABSTRACT

An improved method of warm folding polymeric sheet material and apparatus for accomplishing the method. The method involves applying conductive heat to both sides of the material prior to folding and is accomplished in steps including: (a) positioning the sheet material; (b) positioning a mandrel plate so as to define a fold line for the sheet material; (c) positioning an exterior heater against the material along the fold line; (d) positioning an interior heater element against the material opposite the exterior heater; (e) and (f) applying preselected amounts of heat to the fold line area through the heaters; (g) retracting the interior heater; (h) mechanically folding the sheet material along a fold line; and (i) annealing the fold by applying additional heat through the exterior heater. The process may also be augmented by adding additional steps.

The primary use of the invention is in folding polyvinyl chloride jackets for use in enclosing floppy disks. The method and apparatus are also applicable to other applications and materials.

22 Claims, 4 Drawing Figures

METHOD AND APPARATUS FOR FOLDING POLYMERIC SHEET MATERIAL AND FLEXIBLE DISK JACKETS MADE THEREBY

TECHNICAL FIELD

The present invention relates generally to material folding methods and apparatus and more particularly to methods and apparatus for "warm folding" polymeric plastic materials. The predominant present usage of the improved warm folding method and apparatus of the present invention is in connection with the manufacture of polyvinyl chloride jackets for flexible magnetic disks.

BACKGROUND ART

With the explosion of the information processing industry more and better methods for storing data have been required. One of the most effective methods currently in use utilizes magnetic media deposited on flexible disks, known as "floppy" disks. Floppy disks are enclosed for their protection and alignment in rectangular, usually square, envelopes known as "jackets". The present invention is primarily concerned with the methods and apparatus for manufacture of the floppy disk jackets.

Floppy disk jackets are ordinarily constructed utilizing of a polymeric material known as polyvinyl chloride or "PVC". This material is prepared in thin sheets which are pre-cut to form the outline of a unfolded jacket. The precut sheets are then folded into the appropriate shape (a square envelope) to enclose the floppy disk. The folding, which is ordinarily done at the center, both side portions and the front flap of the jacket, has been accomplished in the past either using a technique known as "cold folding" or by a technique known as "warm folding". Both methods are presently used to make floppy disk jackets in the industry.

The field of the present invention is in relation to the warm folding methods. The warm folding is the preferred method in the industry. The basis for warm folding stems from the fact that PVC and similar plastics and vinyls must be stress-relieved before folding. Stress relief before folding is essential to creating a long-life stable fold. The PVC must enter a quasi-molten state before mechanically stressing the material. PVC's may contain a high number of hard plastic components that may become very brittle under stress. If attempts are made to cold fold, or apply mechanical stress before the molten state obtains, the material may tear and pull microscopicly at the point of mechanical stress, creating microcracks on the edge. Depending on the material's chemical composition, PVC's require a critical amount of heat and time to absorb that heat before the material reaches the quasi-molten state.

Various methods have been utilized to deliver heat to the fold area to soften the material for successful folding. These have included hot air flow, high intensity infrared lamps and electrically resistive heater bars. The air flow method is inefficient in that the heat application is not precisely localized. The infrared lamp method suffers from reflectance differentials, due to material surface differences, and thus the heat delivery is not precisely predictable. Heat is delivered to areas other than the selected fold area. This may occasionally lead to buckling or other degradation of the material surrounding the fold. It has also been found that heater bars, using conductive rather than radiative energy transference, are more electrically efficient and may be more precisely controlled as to temperature and duration. Thus, the present invention is directed at heater bar methods and apparatus.

Prior art warm folding methods are described in U.S. Pat. No. 4,239,572 issued to K. Tomita on Dec. 16, 1980 and in Applicants' own prior patent, U.S. Pat. No. 4,487,218 issued May 8, 1984. Each of these references discloses a method of manufacturing floppy disk jackets or the like utilizing a warm folding technique. However, due to the limitations of the materials, the speeds and accuracies of the prior art methods are restricted. There has remained significant room for improvement in the areas of speed of manufacture and precision of folding.

DISCLOSURE OF INVENTION

Accordingly, it is an object of the present invention to provide an improved warm folding method for polyvinyl chloride and similar materials wich may be performed more rapidly than prior art methods.

It is another object of the present invention to provide specific apparatus for performing the improved warm folding method.

It is a further object of the present invention to provide a method and apparatus whereby the precision of the folds of the polymeric material may be precisely controlled and the material may be prevented from degradation which may cause cracking or other defects in use.

This invention relates to methods and apparatus for folding polymeric material in a precise linear fashion. It specifically relates to folding PVC over a mandrel plate so as to form a rectangular envelope, closed on three sides, out of a pre-cut flat sheet of material. The method and apparatus are also adapted to perform the final fold of the end flap for sealing the envelope. The present invention is particularly adapted for manufacture of jackets for flexible magnetic media disks.

Briefly, a preferred embodiment of the present invention is an improved method for warm folding polymeric sheet material, and a folding apparatus for implementing the method. The method and apparatus are particularly intended for use in manufacturing jackets for flexible magnetic media disks wherein the jackets are manufactured from polyvinyl chloride ("PVC") of similar materials.

The method involves a series of sequential steps, some of which may be interchanged in sequence or performed simultaneously. The involved steps include: (a) positioning the sheet material; (b) positioning a mandrel plate along the sheet material so as to define a folding line or folding zone along at least one edge of the mandrel plate; (c) positioning an exterior heater element against the outside portion of the PVC sheet along the fold line; (d) positioning an interior heater element against the inside portion of the sheet along the fold line; (e) and (f) applying preselected amounts of heat to the fold zone of the material through both the exterior and interior heater elements; (g) retracting the interior heater element from the vicinity of the fold; (h) mechanically folding the sheet about the edge of the mandrel plate to form a 180 degree nearly flat fold along the fold line; and (i) annealing folded area by continuing to apply heat to the fold zone through the exterior heater element. The full version of the preferred embodiment includes embellished versions of the method and additional steps.

The sheet folding apparatus of the present invention includes a folding surface and a holding chuck for holding the sheet material firmly in position; a mandrel plate, being thin and rigid and having straight edges such that the sheet may folded about at least one of the edge of the mandrel plate to form a 180 degree fold; an exterior heating bar; an interior heating bar; means for delivering the exterior and interior heating bars to the vicinity of the fold area; means for creating preselected amounts of heat in the heating bars; and a folding head for mechanically forcing the material about the edge of the mandrel plate to form a 180 degree fold. The apparatus may further include an adhesive applicator for applying a preselected amount of adhesive to the flap to be folded, or, alternatively, a heat stake option wherein the flap is heat welded to the upper portion of the sheet.

An advantage of the present invention is that the jacket made thereby are less susceptible to breaking and cracking in the area of the fold than those of the prior art.

Another advantage of the present invention is that the jackets may be folded more rapidly and with less danger of defect by the application of heat from the interior heater bars.

A further advantage of the present invention is that heating parameters of temperature and duration may be operator adjusted to compensate for deviations in materials.

Yet another advantage of the present invention is that the method may be automated to be performed robotically by the apparatus.

These and other objects and advantages of the present invention will become clear to those skilled in the art in view of the description of the best presently known mode of carrying out the invention and the industrial applicability of the preferred embodiment as described herein and as illustrated in out the invention and the industrial applicability of the preferred embodiment as described herein and as illustrated in the several figures of the drawing.

BEST MODE FOR CARRYING OUT INVENTION

The best presently known mode of practicing the present invention is an improved method of warm folding polymeric sheet materials, and in particular of warm folding polyvinyl chloride sheets into the form of jackets for enclosing flexible magnetic disks. The invention further includes apparatus for performing the inventive method and disk jackets manufactured according to the method.

Figure 1:
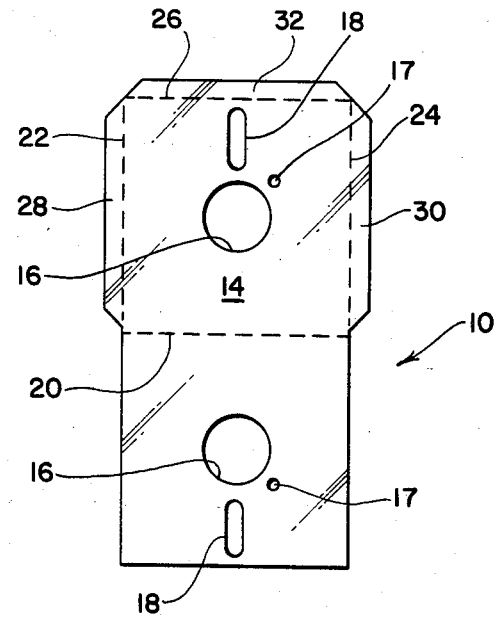
FIG. 1 is a plan view of a portion of a sheet of polymeric material precut to form an unfolded flexible disk jacket.

The method and apparatus of the present invention are best understood in reference to a floppy disk jacket. FIG. 1 illustrates a precut sheet of polymeric material in form ready for folding into a flexible disk jacket. This precut sheet is designated by the general reference character 10. The precut sheet is generally divided into a top half 12 and a bottom half 14. The designations of "top" and "bottom" for the halves of the sheet are arbitrarily selected for convenience only and do not necessarily reflect the orientation of the sheet 10 in all of the operations to be performed. Although this is not a necessary restriction, generally the top half 12 is folded over onto the bottom half 14. Both halves of the precut sheet 10 include an aperture formed therethrough. This aperture, known as a center hole 16, provides the disk handling apparatus with access to the center hub of the magnetic disk after the jacket is sealed, such that the disk may be spun by external apparatus. The top half 12, at least, further includes a registration aperture 17 and a read/write aperture 18. The registration aperture 17 and the read/write aperture 18 are provided such that information contained on the magnetic media may be externally processed and located.

The dotted lines of FIG. 1 illustrate the desired fold lines along which the precut sheet 10 is to be folded in order to form a completed diskette jacket. The precut sheet 10 does not have these fold lines ordinarily marked upon it but they form the appropriate places for folding such that the desired final shape is obtained. The fold lines include a center fold line 20 about which a fold is made which folds the top half 12 over onto the bottom half 14 to form an envelope which is open on three sides. Two of the sides are then enclosed by making folds along a left side fold line 22 and a right side fold line 24. The remaining fold line, the end fold line 26, is the location of a fold to be made after the diskette has been inserted into the jacket. This final fold seals the diskette within the completed envelope.

The extensions of the material of the precut sheet 10 which are folded over along each of the fold lines are flaps which are provided so that the jacket may be sealed. A left side flap 28 is provided for folding along left fold line 22 while a right side flap 30 corresponds to right side fold line 24. After the fold has been made along center fold line 20, the left flap 28 and the right flap 30 are then folded over and bonded to the exterior side of the top half 12 to seal the envelope along the sides.

An end flap 32 is also provided to correspond with end fold line 26. After the remaining folds have been made and the flexible disk has been inserted into the envelope, the material is then folded along end line 26 such that the top flap 32 encloses the disk. In this manner the disk is prevented from escaping the jacket during storage or use. The resulting jacket is thus a fully enclosed envelope containing the magnetic disk.

The above discussion of the construction of the disk jacket is entirely in accordance with the prior methodology and apparatus. The precut sheet of the present invention is no different than that used in prior methods. Thus, the method and apparatus of the present invention are entirely compatible with available precut sheets 10.

Figure 2:
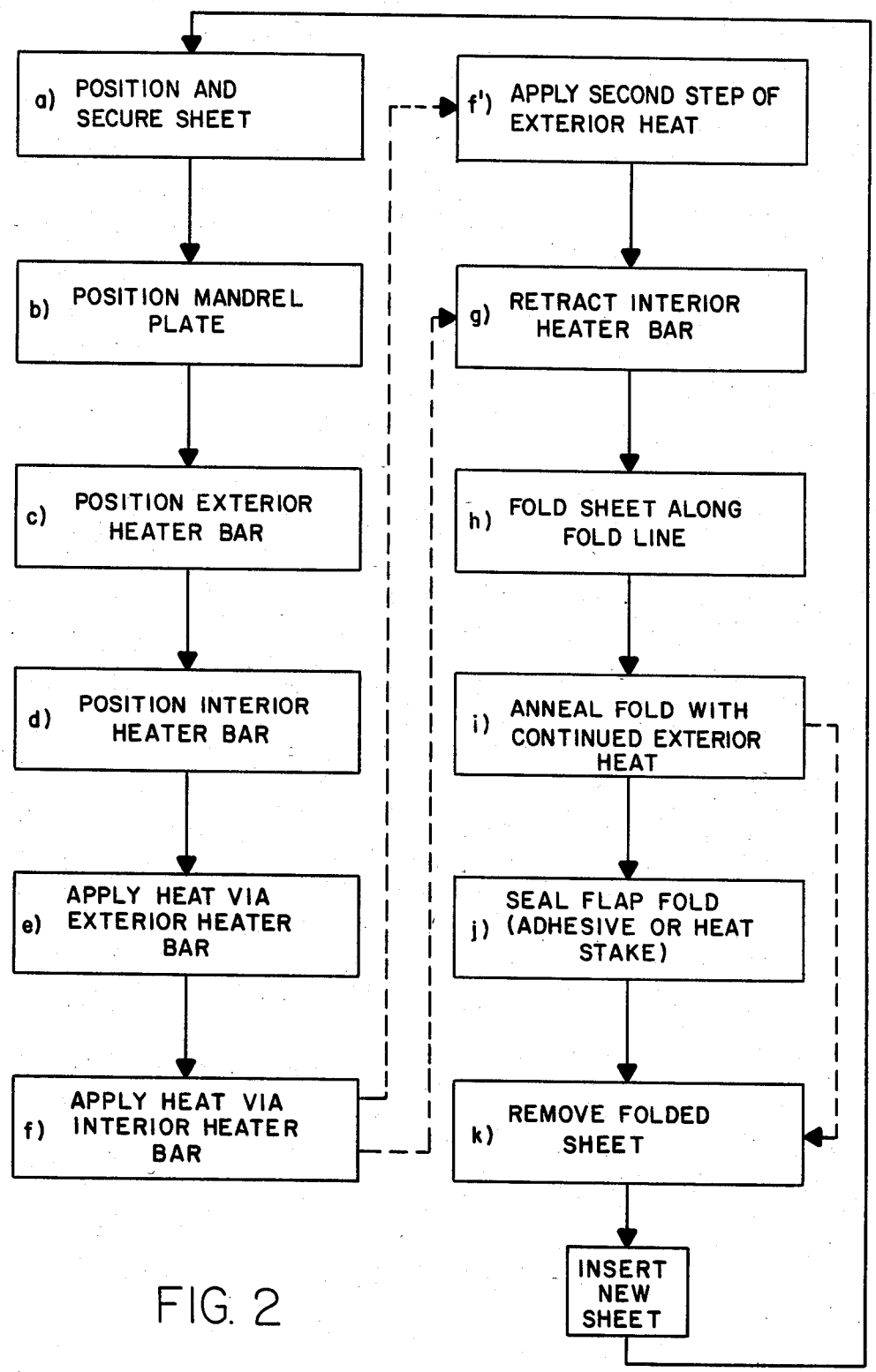
FIG. 2 is a flow chart of the method of the present invention.

The method of the present invention, in the presently preferred embodiment, is illustrated in a flow chart fashion in FIG. 2. This FIG. illustrates the various steps involved in the improved method of folding the precut sheets into final disk jackets. FIG. 2 is described below in conjunction with FIGS. 3A and 3B which illustrate a portion of the apparatus utilized to fold the sheet material.

The method shown in FIG. 2 is applicable to each of the folds along fold lines 20, 22, 24 and 26 of the precut sheet 10. There are some optional elements in the steps of the method as are described herein. For example, for the fold along center fold line 20 there is no flap which is folded over and sealed at the time of the fold. Therefore, no sealing step is involved directly with this particular fold. Furthermore, it is common for the fold about the center line 20 to take place first but to be immediately followed in the same apparatus by the left side fold 22 and the right side fold 24 in the same apparatus. The fold about the end fold line 26 is normally accomplished later in a separate apparatus. However, the basic steps of each fold are consistent throughout.

Figure 3A:
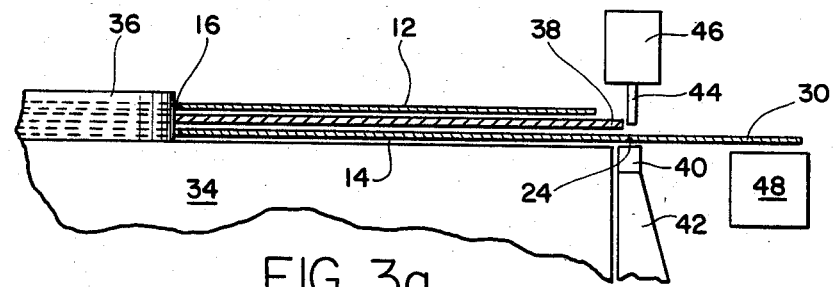
FIG. 3A is a front plan view of a portion of the folding apparatus of the present invention, shown at an interval intermediate steps (b) and (g) of FIG. 2, showing the folding apparatus relating to the right side flap.
Figure 3B:
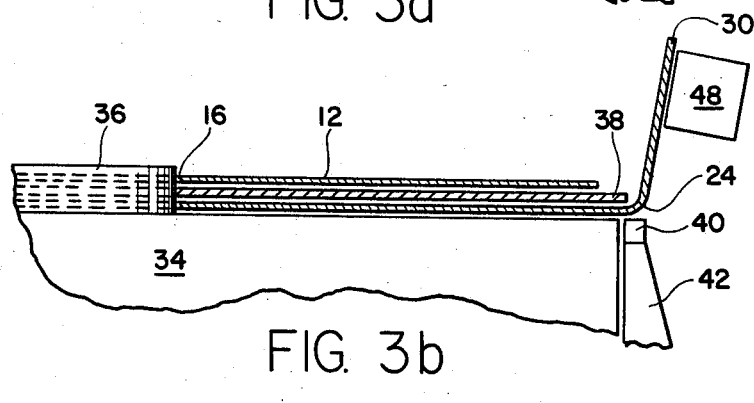
FIG. 3B is a front plan view of the folding apparatus of FIG. 3A, shown during step (h) of FIG. 2.

FIGS. 3A and 3B illustrate the right side 24 folding portion of the apparatus. Thus, all discussion relating to these FIGS. will be in reference to such fold. The remaining folds are substantially symmetric. One significant difference is in the center fold 20. Unlike the fold shown, wherein the upper half 12 is illustrated as already in position, the center fold 20 is utilized to fold the upper half 12 over onto the bottom half 14. Thus, for a center fold 20, the element shown as 12 in FIGS. 3A and 3B would be absent and the flap 30 would be replaced by the actual top half 12.

The first step in the method, shown as step (a) of FIG. 2, is to position and secure the precut sheet 10 on some form of holding apparatus. Typically this is accomplished by securing the sheet in the vicinity of the center hole 16. Securing the sheet in position is necessary such that the sheet does not move during the folding process and harm the symmetry of the fold.

The positioning apparatus, as illustrated in FIGS. 3A and 3B, includes a flat folding platform 34 and a holding chuck 36. The folding platform 34 provides a planar surface upon which the sheet is positioned while the holding chuck 36 extends through the center hole 16 and secures the sheet 10 along the horizontal dimension. As described below, the folding platform 34 includes an electromagnet.

Step (b), as shown in FIG. 2, involves positioning a mandrel plate 38 on the interior side of the positioned sheet 10 such that the edge of the mandrel plate 38 lines up with the fold line 24 about which the desired fold is to be made. The mandrel plate 38 is selected to have an appropriate thickness and edge shaping such that the completed envelope has enough interior room for the diskette to spin freely without encountering frictional slowing or abrasion from the interior surfaces of the jacket. The mandrel plate 38 serves as the edge about which the fold is accomplished. As shown in FIGS. 3A and 3B, the mandrel plate 38 is aligned with the edge of the folding platform 34 and is provided with a center hole aligned with center hole 16 on the jacket sheet 10 such that the mandrel plate 38 fits over the holding chuck 36 for proper alignment. The mandrel plate 38 is constructed of a ferromagnetic material such that activation of the electromagnet in the folding platform 34 secures the mandrel plate 38 in position and prevents any vertical motion of the sheet 10 during the folding operation. The electromagnet is activated during step (b) and remains activated until the fold is completed.

Once the mandrel plate 38 has been secured in position and the precut sheet 10 is held in position on the folding platform 34 the heating elements are brought into play. Steps (c) and (d) of FIG. 2 relate to the positioning of the exterior heater bar 40, carried on an exterior carrier 42 and an interior heater bar 44, carried on a interior heater bar carrier 46. Although the positioning of the exterior heater bar 40 and the interior heater bar 44 is shown in FIG. 2 as being accomplished in separate steps, these steps will ordinarily be performed simultaneously. During steps (c) and (d) the exterior heater element 40 and the interior heater element 44 are positioned by their respective carrier elements 42 and 46 against, or in the near vicinity, of the appropriate fold line area 24. As shown in FIGS. 3A and 3B, the heater elements 40 and 44 are brought into close proximity with the fold area 24 such that thermal energy generated in the heater elements 40 and 44 may be conductively transferred to the polymeric material of the jacket sheet 10 at the fold line 24. The exterior carrier 42 and the interior carrier 46 are mechanically controlled such that they move the respective heater bars 40 and 44 into position and out of position depending on the step required. The carriers 42 and 46 also include the electrical conducting mechanism to deliver preselected amounts of electrical energy to the heater cartridges associated with the heater bars 40 and 44 such that the heater bars 40 and 44 may be heated to preselected temperatures and at the desired rates.

All of the motions of the various elements in the invention are controlled by a microprocessor-based programmable control mechanism. The ranges of motion of the various elements are specified by their construction and the timing and speed of motion is controlled by the microprocessor.

Typically, the exterior and interior heater bars or elements are preselected materials having well-known electrical resistance such that application of specified amount of electrical current will generate precisely controlled amounts of thermal energy.

Once the exterior heater bar 40 and the interior heater bar 44 are in position, electrical current is delivered to the heater bars and the heat caused thereby is delivered to the polymeric material in the vicinity of the fold line. This portion of the process is illustrated in FIG. 2 as Steps (e) and (f). In most applications, steps (e) and (f) will be initiated simultaneously although the durations of the steps may not be exactly equivalent. The amount of heat delivered and the time of application (dwell time) is dependent on the characteristics of the specific polymeric sheet material utilized. Differences in thickness and/or types of material may require alterations of the heater bar temperature and the dwell time. In preferred control apparatus the microprocessor will accept operator programmed values for these parameters. Typically, the amount of heat delivered by the exterior heater bar will exceed that of the interior heater bar since the polymeric adjacent to the exterior bar 40 undergoes a greater stress during the folding process than the interior side of the sheet material. This is due to the fact that the radial distance from the focal point of the fold is greater to the exterior edge of the sheet material than it is to the interior portion. Thus, the exterior portion is stretched to a greater degree and must be heated to a greater degree to flow appropriately. The use of the interior heater bar 44 further prevents bowing or shrinking in the fold area by equalizing the heat application.

In some of the more precise applications of the folding method it is desirable to introduce a second step of heating in the vicinity of the exterior heater bar 40. This step, which is illustrated in FIG. 2 as step (f'), involves applying a second, usually higher magnitude increment of heat to the material through the exterior heater bar 40. This allows the application of sufficient heat to the area while avoiding possible heat shock to the sheet material. Although step (f') is not required for the success of the process it can lead to improved performance in critical situations.

In one embodiment of the present invention the exterior heater bar 40 actually operates as a preliminary folding head. After the fold area has reached the semi-molten state the exterior carrier 42 is pneumatically urged upward such that it forces the sheet material in the fold area 24 to bend about the edge of the mandrel plate 38. The degree of movement is slight and only a small amount of folding is accomplished but the inventors have discovered that this two-stage folding step improves the integrity of the folded zone and further allows the folding head step to proceed more rapidly. The heater bar 40 is also better positioned to anneal the entire fold area, rather than just the lower portion. After the fold is completed the exterior heater bar 40 and exterior carrier 42 reset to their original position.

After a sufficient amount of heat has been delivered to the polymeric material 10 at the fold area 24, the interior heater bar 44 must be retracted out of the way to allow an appropriate fold. This retraction is illustrated as step (g) in FIG. 2. Typically, the heating from the exterior heater bar will continue even after the interior heater bar 44 has been removed. FIG. 3B illustrates the necessity of retracting the interior heater bar 44, since it would prevent folding if it remained in place.

When the fold area 24 has been appropriately heated and the interior heater bar has been retracted out of the way the actual fold is accomplished. The particular method of fold may be any method desired but the presently preferred embodiment utilizes the method shown and described in Applicants' prior U.S. Pat. No. 4,447,218. The step of folding is illustrated in FIG. 2 as step (h). FIG. 3B illustrates the apparatus in the middle of the fold operation.

During the folding step, and for a time thereafter, heat is continually applied to the fold area by the exterior heater bar. This amount of thermal energy, which is carefully controlled both as to magnitude and duration, is utilized to anneal the folded sheet into its new position. The polymeric material has "memory" and will strive to retain the shape that it is molded into. Annealing, as illustrated is step (i) in FIG. 2, aids the polymeric material in achieving a memory of the newly folded shape rather than the prior flat sheet shape. Annealing is also advantageous in preventing cracking or other degradation of the material in the fold area 24 during later use.

After the fold area 24 has been properly annealed, it may be desirable to seal the fold in some manner, as illustrated as step (j) in FIG. 2. This step is optional since certain folds, such as the center fold 20, will not have anything to seal. In some cases also, various users prefer to have the jacket flaps 28, 30 and 32 unsealed and held in position only by the material memory. However, in most cases flaps 28, 30 and 32 are sealed to the outer surface of the top half 12 of the jacket 10 after they are folded.

The most common methods utilized for sealing the jacket flaps are the use of adhesives and the use of heat stakes. If an adhesive method is utilized an appropriate dollop of adhesive is applied either to the inside surface of the flap 30 or to the portion of top half 12 onto which the fold will occur. The quantity of adhesive and the timing of application are dependent upon the particular requirements of the situation and the apparatus.

The heat stake method is similar to metal welding. In this instant an extremely hot bar is pressed into the outside of the flap 28, 30 or 32 and forces the flap material into material of the top half 12. The polymeric material is melted to an extent that a weld is formed which holds the flap securely in place.

Once the flaps have been sealed, the folding process is complete and all that remains, as shown in step (h), is to transport the folded jacket to a different area for further processing and to repeat the entire procedure with a new precut sheet 10.

The entire process is controlled in a method which is specific to the precise dimensions and type of material selected by the user. Thus it is desirable to set the process by controlling the apparatus using a microprocessor or other programmable control mechanism. The control mechanism is utilized to establish the sequence, magnitudes and durations of the various steps. Any of various well known types of control mechanisms may be utilized, depending on the apparatus selected.

Various factors affect the duration and sequence as well as the magnitude of various of the steps. With these considerations, which vary from material to material and thickness to thickness, include the dwell time of the heater bars 40 and 44 in the vicinity of the fold line 24, the thickness of the mandrel plate 38 and other factors. These must be custom selected for each application. The presently preferred embodiment of the folding apparatus, as illustrated in FIG. 3a and 3b, is particularly adapted for use with polyvinyl chloride material.

The preferred exterior heater element 40 and interior heater element 44 are constructed of chromium plated oxygen-free copper materials selected for high quality heat transference. Heat is delivered to the heater bars by way of integrally formed with custom wound 200 watt heater cartridge inserts. These inserts are provided with 5% additional windings at the ends to compensate for heat losses due to end radiation. This permits uniform bar heating over the entire length. The immediate control of the heater bar mechanisms is accomplished using solid state commercial proportional heater controllers using J-type thermocouple sensors inserted into the copper heater bars. In this manner, it is typically possible to achieve accuracies of ±1 degree Celsius in terms of tolerance. Furthermore, extremely rapid response is possible.

The preferred mandrel plate 38 is a very precisely machined item of a hard material. The preferred mandrel plate 38 is manufactured from high strength, blue-tempered spring steel, precision ground to perform custom dimensioning of the jacket material.

The transport mechanisms for the apparatus, such as the exterior carrier 42, the interior carrier 46 and the folding head 48, are mechanical in nature. In the preferred embodiment, these are controlled pneumatically as described in Applicants' prior patent. The pneumatic mechanisms provide rapid and precisely controlled motion of the various elements with extreme repeatability. The presently preferred embodiment utilizes linear vertical motion for the exterior carrier 42 with rotational motion for the interior carrier 46 and the folding head 48.

Various modifications and alterations of both the method and the apparatus are possible and may be utilized for various custom applications. Some of these involved altering the order of the process steps and/or performing some of them simultaneously. Other modifications involve changing the nature of the heater elements from bars to some other method of delivering thermal energy and changing the method of transport for the various elements. Since the invention relates to a process and to apparatus which are in many ways custom designed for the specific application, various specific modifications will be required in any instance.

Those skilled in the art will readily observe that numerous other modifications and alterations of the process and apparatus may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The improved folding method and apparatus of the present invention are adaptable into currently existing folding machines and easily built into new machines. They are particularly adaptable for use in folding polyvinyl chloride sheets into jackets for floppy disks.

The method and apparatus of the present invention have been commercially utilized in folding machines manufactured and distributed by Unmanned Solutions, Inc. of Fremont, Calif. These machines have proven to have significant industrial applicability and are presently in use throughout the data processing industry. It is expected that the present invention will continue to have widespread industrial utility.

I claim:

1. A method for folding polymeric sheet material, in steps comprising:
   (a) Positioning the sheet material in a firmly held position;
   (b) Positioning a mandrel plate such that an edge of said mandrel plate is aligned with a preselected fold line on the interior side of the sheet;
   (c) Positioning an exterior heater element against the exterior portion of the sheet along said fold line;
   (d) Positioning an interior heater element against the interior portion of the sheet along said fold line;
   (e) Applying a preselected amount of heat by conduction to the fold line area of the sheet through said exterior heater element;
   (f) Applying a preselected amount of heat by conduction to the fold line area of the sheet through said interior heater element;
   (g) Retracting said upper heater element from the vicinity of the sheet;
   (h) Folding the sheet along said fold line about said mandrel plate; and
   (i) Annealing the fold area by applying a further preselected amount of heat through said exterior heater element.

2. The method of claim 1 wherein steps (c) and (d) are performed simultaneously.

3. The method of claim 1 wherein, subsequent to step (e), a further preselected amount of heat, greater than the amount of step (e), is applied through said exterior heater element.

4. The method of claim 1 wherein the folding of step (h) is accomplished by applying a rotary folding head apparatus to the exterior of the sheet and forcing the sheet to fold about the edge of said mandrel plate.

5. The method of claim 4 wherein said folding head continues to force the sheet into the folded position about the mandrel plate until the annealing process of step (i) is completed.

6. The method of claim 1 wherein, prior to step (c), a preselected portion of adhesive is applied to the portion of the sheet which is to be folded, such that said adhesive will cause adherence of the folded sheet to another portion of itself.

7. The method of claim 1 and further including:
   (j) Removing said mandrel plate from the vicinity of said fold, and transporting the folded sheet from the fold area.

8. The method of claim 1 wherein the sheet material includes a flap to be folded along said fold line such that the interior side of a portion of said flap abuts against an additional portion of said sheet.

9. The method of claim 8 wherein, subsequent to step (h), said flap is welded to said additional portion of said sheet by a heat stake mechanism.

10. The method of claim 1 further including, subsequent to step (f), a step of delivering said exterior heating element to an extended position against the polymeric material for a short distance so as to urge the material to deform slightly about the edge of said mandrel plate.

11. The method of claim 5 further including, subsequent to step (f) a step of delivering said exterior heating element to an extended position against the polymeric material for a short distance, so as to urge the material to deform slightly about the edge of said mandrel plate.

12. The method of claim 11 wherein said exterior heating element is maintained in said extended position throughout said folding and annealing steps and then is reset to its original position.

13. Flexible disk jackets formed from precut sheets of polymeric material by process including steps comprising;
   (a) positioning a sheet of material in a firmly held position;
   (b) Positioning a mandrel plate such that an edge of said mandrel plate is aligned with a preselected fold line on the interior side of the sheet;
   (c) Positioning an exterior heater element against the interior portion of the sheet along said fold line;
   (d) Positioning an interior heater element against the interior portion of the sheet along said fold line;
   (e) Applying a preselected amount of heat to the fold line area of the sheet through said exterior heater element;
   (f) Applying a preselected amount of heat by conduction to the fold line area of the sheet through said interior heater element;
   (g) Retracting said upper heater element from the vicinity of the sheet;
   (h) Folding the sheet along said fold line about said mandrel plate; and (i) Annealing the fold area by applying a further preselected amount of heat through said exterior heater element.

14. The jackets of claim 13 wherein said process further includes, subsequent to step (e), application of further preselected amount of heat, greater than the amount of step (e), through said exterior heater element.

15. The jackets of claim 13 wherein the folding of step (h) is accomplished by applying a rotary folding head apparatus to the exterior of the sheet and forcing the sheet to fold about the edge of said mandrel plate.

16. The jackets of claim 15 wherein said folding head continues to force the sheet into the folded position about the mandrel plate until the annealing process of step (i) is completed.

17. The jackets of claim 13 wherein, prior to step (c), a preselected portion of adhesive is applied to the portion of the sheet which is to be folded, such that said adhesive will cause adherence of the folded sheet to another portion of itself.

18. The jackets of claim 13 wherein the sheet material includes a flap to be folded along said fold line such that the interior side of a portion of said flap abuts against an additional portion of said sheet when the fold is completed.

19. The jackets of claim 18 wherein, subsequent to step (h), said flap is welded to said additional portion of said sheet by a heat stake mechanism.

20. The jackets of claim 13 and further including, subsequent to step (f), a step of delivering said exterior heating element to an extended position against the polymeric material for a short distance so as to urge the material to deform slightly about the edge of said mandrel plate.

21. The jackets of claim 16 and further including, subsequent to step (f), a step of delivering said exterior heater element to an extended position against the polymeric material so as to force the polymeric material to deform about the edge of said mandrel plate and to be partially folded thereabout.

22. The jackets of claim 21 wherein said exterior heating element is maintained in said extended position throughout said folding and annealing steps and then reset to its original position.

* * * * *